(12) United States Patent
Passot et al.

(10) Patent No.: US 9,406,954 B2
(45) Date of Patent: Aug. 2, 2016

(54) METHOD OF DEPOLLUTION AND REGENERATION OF A FUEL CELL ELECTRODE POISONED BY SULFUR COMPOUNDS

(75) Inventors: Sylvain Passot, Tullins (FR); Christel Faure, Tullins (FR); Alejandro Franco, Eybens (FR); Olivier Lemaire, Les Abrets (FR)

(73) Assignees: COMMISSARIAT A L'ENERGIE ATOMIQUE ET AUX ENERGIES ALTERNATIVES, Paris (FR); L'AIR LIQUIDE, Paris (FR)

( * ) Notice: Subject to any disclaimer, the term of this patent is extended or adjusted under 35 U.S.C. 154(b) by 355 days.

(21) Appl. No.: 14/131,970

(22) PCT Filed: Jun. 12, 2012

(86) PCT No.: PCT/EP2012/061055
§ 371 (c)(1),
(2), (4) Date: Feb. 5, 2014

(87) PCT Pub. No.: WO2013/007459
PCT Pub. Date: Jan. 17, 2013

(65) Prior Publication Data
US 2014/0170517 A1   Jun. 19, 2014

(30) Foreign Application Priority Data
Jul. 13, 2011   (FR) ..................... 11 56379

(51) Int. Cl.
*H01M 8/04*   (2016.01)
*H01M 8/10*   (2016.01)

(52) U.S. Cl.
CPC ...... *H01M 8/04753* (2013.01); *H01M 8/04223* (2013.01); *H01M 2008/1095* (2013.01); *Y02E 60/50* (2013.01)

(58) Field of Classification Search
CPC ..................... H01M 8/04223; H01M 8/04753
See application file for complete search history.

(56) References Cited

U.S. PATENT DOCUMENTS 6,329,089 B1 *  12/2001  Roberts ............. H01M 8/04089
                                                      429/429
9,099,704 B2 *   8/2015  Jia ..................... H01M 8/04089
(Continued)

FOREIGN PATENT DOCUMENTS

| JP | 2006-260909 A | 9/2006 |
| JP | 2011-060531 A | 3/2011 |
| WO | 2007/083616 A1 | 7/2007 |
| WO | 2010/141769 A1 | 12/2010 |

OTHER PUBLICATIONS

Fernando H. Garzon, et al., "The Impact of Hydrogen Fuel Contaminates of Long-Term PMFC Performance", ECS Transactions, 2006, pp. 695-703, vol. 3, No. 1.

(Continued)

*Primary Examiner* — Stewart Fraser
(74) *Attorney, Agent, or Firm* — Baker & Hostetler LLP (57) ABSTRACT

A method for depolluting and regenerating a catalytic fuel-cell electrode, the reaction of the fuel of the cell and capture of at least one polluting species occurring on the catalytic electrode, comprises: a decrease, at a constant first reference current density, in fuel flow, relative to a nominal fuel flow, for a first length of time, leading to a value for the stoichiometric coefficient of fuel lower than 1, to increase oxidation potential on the catalytic electrode and reach oxidation potential of the polluting species, to eliminate it; a cut-off of current for a cut-off time; an increase in flow above nominal flow, leading to a value of stoichiometric coefficient higher than or equal to 1; and an increase in current density until a second current density chosen by operator and possibly identical to or different from the initial reference current density, is reached.

20 Claims, 5 Drawing Sheets

(56) References Cited

U.S. PATENT DOCUMENTS

| | | |
|---|---|---|
| 2006/0249399 A1 | 11/2006 | Uribe et al. |
| 2008/0026268 A1 | 1/2008 | Zeng |
| 2010/0233554 A1 | 9/2010 | Nogi et al. |
| 2011/0177414 A1* | 7/2011 | Umeda ............ H01M 8/04223 429/432 |

OTHER PUBLICATIONS

Idoia G. Urdampilleta, et al., "PEMFC Poisoning with H2S: Dependence on Operating Conditions", ECS Transactions, 2007, pp. 831-842, vol. 11, No. 1.

D. Imamura, et al., "Effect of Sulfur-Containing Compounds on Fuel Cell Performance", ECS Transactions, 2007, pp. 853-862, vol. 11, No. 1.

Michel-Vital Mathieu, et al, "Sulfurization and Regeneration of Platinum", Applied Catalysis, 1984, pp. 361-370, vol. 9, Elsevier Science Publishers B.V., Amsterdam, NL.

Didier Devilliers, et al., "Cellules Electrochimiques: Aspects Thermodynamiques et Cinetiques—Applications aux Generateurs et aux Electrolyseurs Industriels" "Electrochemical Cells: Thermodynamics and Kinetics of Electrochemical Reactions", Jan. 2003, pp. 31-40.

Office Action in Japanese Patent Application No. 2014-519474, dated Mar. 29, 2016.

* cited by examiner

METHOD OF DEPOLLUTION AND REGENERATION OF A FUEL CELL ELECTRODE POISONED BY SULFUR COMPOUNDS

CROSS-REFERENCE TO RELATED APPLICATIONS

This application is a National Stage of International patent application PCT/EP2012/061055, filed on Jun. 12, 2012, which claims priority to foreign French patent application No. FR 1156379, filed on Jul. 13, 2011, the disclosures of which are incorporated by reference in their entirety.

FIELD OF THE INVENTION

The field of the invention is that of proton exchange membrane fuel cells (PEMFCs).

Figure 1A:
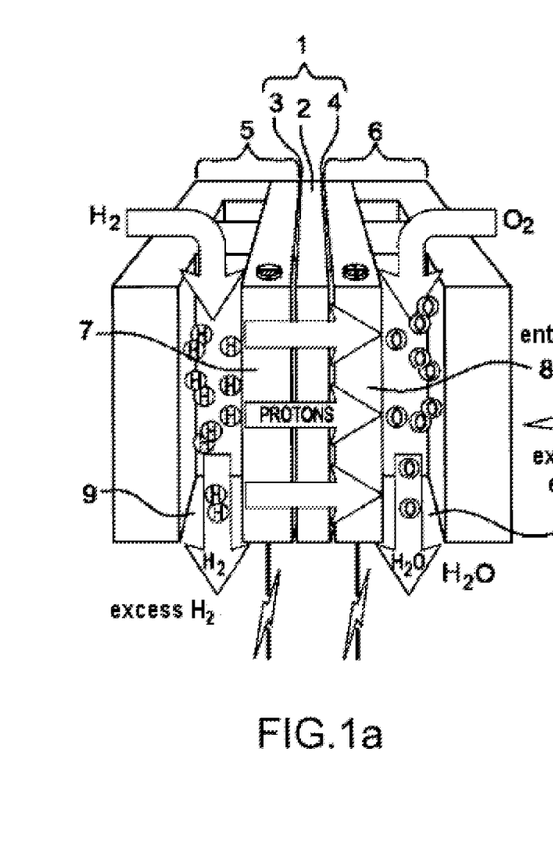
FIGS. 1a and 1b schematically illustrate the operating principle of a PEMFC fuel cell.
Figure 1B:
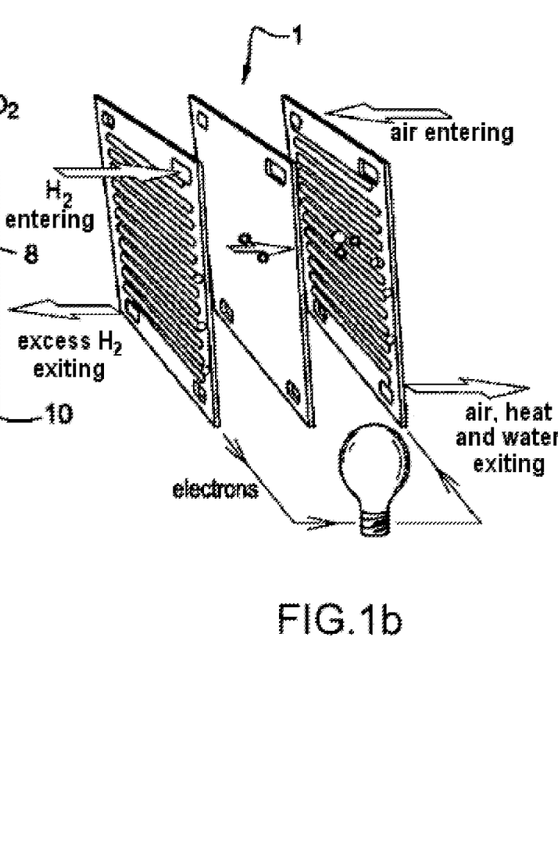

PEMFCs are current generators the operating principle of which relies on the conversion of chemical energy into electrical power via catalytic reaction of hydrogen and oxygen. Membrane-electrode assemblies (MEAs), commonly called cell cores, are the basic elements of PEMFCs. As shown in FIGS. 1a and 1b, a cell core 1 is composed of a polymer membrane 2, and catalytic layers 3, 4 present on either side of the membrane 2 and forming the anode and cathode, respectively.

BACKGROUND

The membrane 2 therefore allows the anodic compartment 5 and the cathodic compartment 6 to be separated. The catalytic layers 3, 4 generally comprise nanoparticles supported by carbon aggregates. Gas diffusion layers 7, 8 (carbon fabric, felt, etc.) are placed on either side of the MEA 1, in order to ensure electrical conduction, uniform distribution of the reactive gases, and evacuation of water produced by the reaction. A system of channels 9, 10 placed on either side of the MEA delivers the reactive gases and evacuates, to the exterior, water and excess gases.

At the anode 3, decomposition of hydrogen absorbed on the catalyst produces protons $H^+$ and electrons $e^-$. The protons then pass through the polymer membrane before reacting with oxygen at the cathode 4.

Reaction of the protons with oxygen at the cathode leads to the formation of water and to the production of heat 4.

Depending on the production method of the hydrogen, the gas may comprise impurities. It has been demonstrated that carbon monoxide and sulfur compounds are particularly detrimental to cell operation.

In this context, maximum concentration thresholds have been proposed to standardize the quality of the hydrogen used in fuel cells in automotive applications: for example 0.2 µmol/mol for CO and 0.004 µmol/mol for sulfur compounds.

Hydrogen sulphide ($H_2S$) is, in general, the main sulfur compound present in the hydrogen. The generally accepted dissociative absorption mechanism of $H_2S$ on platinum, as described in the article by M.-V. Mathieu, M. Primet, *Applied Catalysis*, 9 (3) 361-370 (1984), is the following:

$$H_2S + Pt \rightarrow Pt-S + H_2 \quad (1)$$

$$H_2S + Pt-H \rightarrow Pt-S + \tfrac{3}{2}H_2 \quad (2)$$

Sulfur adsorption on the platinum (Pt—S) poisons catalytic sites and this adsorbed sulfur is particularly difficult to desorb (very strong Pt—S chemical bond). The sulfur blocks catalytic sites for the oxidation reaction of the hydrogen, thereby leading to an increase in the anodic overvoltage by a few tens of millivolts and a decrease in the performance of the cell.

Whereas carbon monoxide desorbs easily in the presence of pure hydrogen, sulfur adsorption on platinum is considered to be partially reversible or even irreversible in the presence of pure hydrogen: the sulfur remains bonded to the platinum and the electrical performance of the cell remains poor. It should be noted that pollution by air-side sulfur compounds also leads to a partially reversible decrease in the performance of the cell.

A number of methods have been proposed to "clean" the surface of the catalyst in case of poisoning by species highly absorbed on the surface of the catalyst, and thus to improve the electrical performance of the fuel cell, in order to improve the performance of a cell stack after a phase of pollution with sulfur compounds.

1) A first method uses cyclic voltammetry:

It has thus been proposed to clean the surface of the catalyst by carrying out one or more cyclic voltammetry cycles on the anode as described in: F. H. Garzon, T. Rockward, I. G. Urdampilleta, E. L. Brosha, F. A. Uribe, *ECS Trans.*, 3 (1) 695-703 (2006). This cyclic voltammetry allows a sufficiently high anodic potential (typically a potential comprised between 0.9V and 1.3V) to be reached to oxidize the sulfur, one of the possible reactions of which is:

$$Pt-S + 4H_2O \leftrightarrow SO_4^{2-} + 8H^+ + 6e^- Pt \quad (3)$$

Nevertheless, this method requires the use of an external generator to be able to apply the potential sweep. Such a generator is not necessarily present in real systems.

2) A second known prior-art method uses power pulsing:

This solution consists in applying a short pulse in order to reach the potential required for oxidation of the sulfur layer (3). This solution was recently patented by Los Alamos National laboratory and is notably described in the article: F. A. Uribe, T. Q. T. Rockward, Cleaning (de-poisoning) PEMFC electrodes from strongly adsorbed species on the catalyst surface. US 2006/0249399 A1. 2006. This pulse may last 20 seconds, at 30 A and 1.4V. In this solution, the inventors apply a potentiostatic mode, i.e. the voltage of the cell is fixed and the current density changes over time. They propose:

either to stop hydrogen flow completely, while maintaining potential difference, with the aim of oxidizing residual hydrogen, before disconnecting the fuel cell and applying the pulse in order to oxidize the sulfur compounds;

or to decrease the hydrogen flow and apply a larger pulse in order to oxidize the hydrogen and the sulfur compounds.

Just like the preceding solution, this solution requires the use of an external power source. This solution is presented for the case of potentiostatic operation.

3) A third solution uses a period at OCV (open-circuit voltage=zero current):

It has also been proposed to place the cell at OCV, i.e. to stop the supply of the cell in order to recover its performance after poisoning by hydrogen sulphide, as described in the articles I. G. Urdampilleta, F. A. Uribe, T. Rockward, E. L. Brosha, B. S. Pivovar, F. H. Garzon, *ECS Trans.*, 11 (1) 831-842 (2007) and D. Imamura, Y. Hashimasa, *ECS Trans.*, 11 (1) 853-862 (2007). The $H_2S$ poisoning is followed by a return phase under pure hydrogen, then a phase at the OCV for several hours in order to allow performance recovery. The several-hour-long period at OCV seems to allow sulfur compounds to be desorbed. This solution corresponds to galvanostatic operation. Poisoning occurs at fixed current, the potentials of the electrodes and the voltage of the cell are therefore allowed to vary.

4) A fourth solution consists in regenerating the anode by decreasing fuel flow and therefore decreasing the stoichiometric coefficient so as to enable the polluting species to be oxidized. Such a solution has especially been described in patent application US 2010/0233554.

Generally, poisoning of an electrode by compounds, for example sulfur compounds, leads to formation, on the surface of the catalyst, of a sulfur layer that can be oxidized, by one of the possible reactions, such as reaction (3), only at a high electrode potential.

On the anode side, the overall oxidation reaction of the hydrogen is the following:

$$H_2 \rightarrow 2H^+ + 2e^- \quad (4)$$

One hydrogen molecule therefore produces 2 protons and 2 electrons. The hydrogen flow required to establish a current I (in A) is given by the following equation:

$$Q_{H_2}(\text{mol s}^{-1}) = \frac{I}{2 \times F} \quad (5)$$

where F is the Faraday constant (in A·s·mol$^{-1}$).

In fuel-cell systems, hydrogen, at the anode, and air (or oxygen), at the cathode, are very often injected in excess (operation in superstoichiometric mode). The hydrogen flow required to establish the current is therefore multiplied by the stoichiometric coefficient $St_{H_2}$:

$$Q_{H_2}(\text{mol s}^{-1}) = St_{H_2} \times \frac{I}{2 \times F} \quad (6)$$

the stoichiometric coefficient corresponding to the excess of injected gas.

For a constant current density, if the hydrogen stoichiometric coefficient is decreased below unity the hydrogen flow will no longer be sufficient to supply the amount of electrons necessary to keep the current at its setpoint value. Thus, in a first step, the current is maintained by oxidation of residual hydrogen. Next, as there is an insufficient amount of hydrogen, anodic potential will increase. In order to maintain constant current, reaction mechanisms other than the oxidation reaction of hydrogen are solicited. These other mechanisms, for example reaction (3), which is the oxidation of sulfur adsorbed on the surface of the platinum to form sulfuric acid, are made possible by virtue of the increase in potential, leading to regeneration of the anode which was previously polluted.

Nevertheless, the Applicant has observed that during the anode regeneration period operation at the cathode degrades, the cathode potential dropping, possibly because of cathode-corrosion effects especially caused by the overabundance of water produced in the regeneration phase.

SUMMARY OF THE INVENTION

To palliate this effect, the present invention proposes an optimized depollution and regeneration method.

More precisely, the subject of the invention is a method for depolluting and regenerating a catalytic fuel-cell electrode, the reaction of the fuel of the cell and capture of at least one polluting species occurring on said catalytic electrode, characterized in that it comprises the following steps:

a decrease, at a constant current density called the first reference current density, in fuel flow, relative to a nominal fuel flow, for a first length of time, leading to a value for the stoichiometric coefficient of said fuel lower than 1, so as to increase the oxidation potential on said catalytic electrode and reach the oxidation potential of said polluting species, in order to eliminate it;

a cut-off of the current for a length of time called the cut-off time;

an increase in fuel flow above the nominal flow, leading, once more, to a value of the stoichiometric coefficient higher than or equal to 1; and an increase in the current density until about a second current density chosen by the operator and possibly identical to or different from the initial reference current density, is reached.

In one embodiment of the invention, the method comprises passage to zero current triggered by observation of a drop in current density, possibly, for example, of 10%.

In one embodiment of the invention, the method comprises passage to zero current triggered by potential control.

In one embodiment of the invention, the length of time called the cut-off time is about a few minutes.

In one embodiment of the invention, the increase in current density until about said second current density is reached is carried out gradually.

In one embodiment of the invention, the increase in the current density until about said second current density is reached is carried out in successive steps.

In one embodiment of the invention, the fuel is hydrogen-based, the catalytic electrode being noble-metal based.

In one embodiment of the invention, the noble metal is platinum, palladium or ruthenium.

In one embodiment of the invention, the fuel is based on pure hydrogen.

In one embodiment of the invention, the fuel is based on reformed hydrogen.

In one embodiment of the invention, the catalytic electrode comprises platinum nanoparticles supported by carbon aggregates.

In one embodiment of the invention, the polluting species is a sulfur-containing species and possibly hydrogen sulphide.

In one embodiment of the invention, the duration of the decrease in hydrogen flow is adjusted to achieve a threshold anodic potential on the catalytic electrode at least higher than 0.9 V.

In one embodiment of the invention, the decrease in hydrogen flow is maintained for at least about one minute and less than about ten minutes.

In one embodiment of the invention, the polluting species is a carbon-containing species and possibly carbon monoxide.

In one embodiment of the invention, the method for depolluting and regenerating a catalytic fuel-cell electrode according to the invention comprises the following steps in succession:

a decrease in fuel flow from a nominal value corresponding to a first stoichiometric value, for a first length of time, causing the potential on said catalytic electrode to pass from an initial value to a first value higher than or equal to the oxidation potential of the polluting species;

an increase in fuel flow corresponding to a second stoichiometric value, for a second length of time, in order to accelerate the flow of fuel toward the catalytic sites of the anode; and return of the flow to said nominal operating value for the reaction of the fuel at the catalytic electrode.

In one embodiment of the invention, the first length of time and the second length of time are about a few minutes.

In one embodiment of the invention, the first stoichiometric value is about equal to 0.5, the second stoichiometric value being about equal to 2.

BRIEF DESCRIPTION OF THE DRAWINGS

The invention will be better understood and other advantages will become apparent on reading the following nonlimiting description, and by virtue of the appended figures in which.

DETAILED DESCRIPTION

The present invention is described below in the context of a proton exchange membrane fuel cell without this representing a limitation of the invention.

As described above, poisoning of an electrode by sulfur compounds leads to the formation, on the surface of the catalyst, of a sulfur layer that can be oxidized, by one of the possible reactions, such as the reaction (3), only at a high electrode potential.

It is proposed in the invention to act upon the hydrogen flow via the stoichiometric coefficient $St_{H_2}$.

On the anode side, the overall oxidation reaction of the hydrogen is the following:

$$H_2 \rightarrow 2H^+ + 2e^- \quad (4)$$

One hydrogen molecule therefore produces 2 protons and 2 electrons. The hydrogen flow required to establish a current I (in A) is given by the following equation:

$$Q_{H_2}(\text{mol s}^{-1}) = \frac{I}{2 \times F} \quad (5)$$

where F is the Faraday constant (in A·s·mol$^{-1}$).

In fuel-cell systems, hydrogen, at the anode, and air (or oxygen), at the cathode, are very often injected in excess (operation in superstoichiometric mode). The hydrogen flow required to establish the current is therefore multiplied by the stoichiometric coefficient $St_{H_2}$:

$$Q_{H_2}(\text{mol s}^{-1}) = St_{H_2} \times \frac{I}{2 \times F} \quad (6)$$

the stoichiometric coefficient corresponding to the excess of injected gas.

For a constant current density, if the hydrogen stoichiometric coefficient is decreased below unity the hydrogen flow will no longer be sufficient to supply the amount of electrons necessary to keep the current at its setpoint value. Thus, in a first step, the current is maintained by oxidation of residual hydrogen. Next, as there is an insufficient amount of hydrogen, anodic potential will increase. In order to maintain constant current, reaction mechanisms other than the oxidation reaction of hydrogen are called into play. These other mechanisms, for example reaction (3), which is the oxidation of sulfur adsorbed on the surface of the platinum to form sulfuric acid, are made possible by virtue of the increase in potential.

Thus, the solution of the present invention does not use an external power source, in contrast to some of the prior-art solutions, and does not require the cell stack to be shut down to oxidize the sulfur.

In the present case, it is a question of operating in galvanostatic mode, i.e. at fixed current density, the potentials of the electrodes, and therefore the cell voltage, varying over time. Thus, at fixed current density, the decrease in the hydrogen flow leads to an increase in anodic potential (and a decrease in cathodic potential), thereby enabling oxidation of the sulfur compounds. In potentiostatic mode, the decrease in hydrogen flow only leads to a decrease in current density, the cell voltage (and therefore the potentials) remaining the same, the sulfur compounds are therefore not oxidized, and it is necessary to apply an electrical pulse with an external electrical supply.

According to the present invention, it is necessary to decrease hydrogen flow to a stoichiometry below unity (stoichiometric coefficient between 0 and 1) for a certain first length of time. Typically, the length of time required to achieve an anodic potential at least higher than 0.9 V-1.1 V may be between 1 and 10 minutes.

Specifically, this first length of time must be sufficiently short to prevent other reaction mechanisms that could degrade the electrode (for example carbon corrosion, water electrolysis, etc.) from being overly solicited, and sufficiently long to oxidize all of the sulfur-containing species adsorbed on the catalyst.

According to the present invention, it is proposed then to follow the following protocol of steps:
  passage to zero current;
  maintenance of zero current for a length of time longer than 30 seconds, and preferably about 5 minutes;
  increase of the hydrogen flow stoichiometric coefficient to a value higher than 1; and
  increase of the current density to a current-density value called the reference value prior to the regeneration procedure.

The passage to zero current may be triggered by observation of a drop in current density (typically it may be triggered after a drop of about 10% in the current-density value called the reference value) or by potential control.

According to this second alternative, it may be advantageous to use a command-control device for potential control in order to optimize dynamically the various lengths of time to be respected before hydrogen flow is increased. This device may, for example, be specified, in the context of a complete device equipped with sensor and alarm systems, for this purpose and carry out the various following steps:

Step E1: deactivation of set alarms before commencing the regeneration procedure in order to prevent the procedure provided according to the present invention from causing the system to fault-out, these alarms may typically relate to the safety of the voltages and hydrogen flow.

Step E2: acquisition of the value of the cell voltage.

Step E3: decrease of the nominal hydrogen stoichiometric coefficient in order to pass to a value lower than 1.

Step E4: cut-off of the current, allowing operation of the cell to be stopped, and, furthermore, the cathode to be regenerated.

Step E5: increase of the hydrogen stoichiometric coefficient to return to a value higher than 1.

Step E6: maintenance of the superstoichiometric $H_2$ flow as long as the cell voltage is not at least equal to its value before regeneration, which value was acquired in step E2.

Step E7: return of the hydrogen stoichiometric coefficient to its nominal value (value before modification in step E3).

Step E8: reactivation of the safety measures deactivated in step E1.

The operation of decreasing hydrogen flow may be carried out one or more times so as to totally recover the performance of the cell.

It will be noted that this method may be applied in the presence of pure hydrogen or in the presence of hydrogen comprising impurities, such as reformed hydrogen.

Example Test Carried Out According to the Depollution and Regeneration Method of the Invention.

A proton exchange membrane hydrogen fuel cell was tested for 50 hours, and poisoning by 45 ppb $H_2S$ led to a loss of 110 mV, i.e. 17% of the cell voltage.

Figure 2:
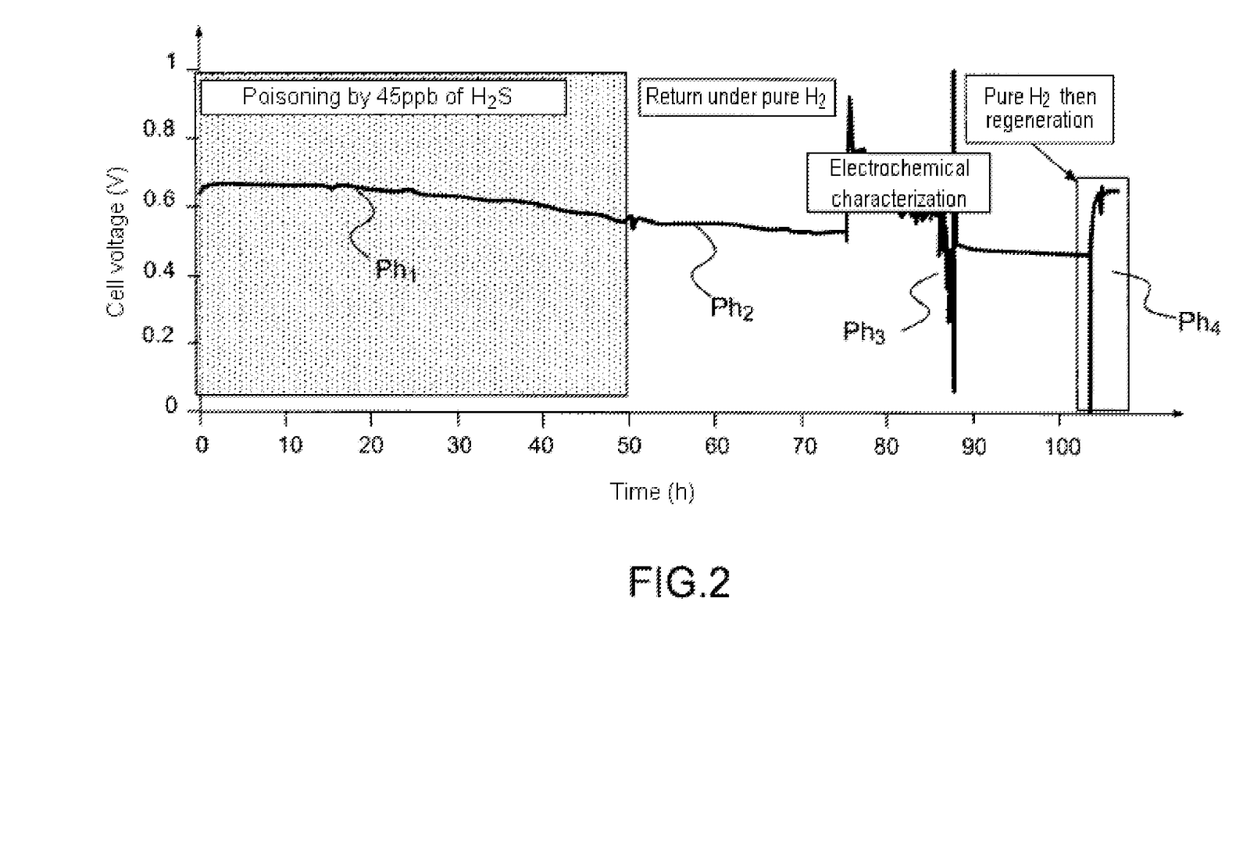
FIG. 2 illustrates the variation in cell voltage during poisoning by hydrogen sulphide, followed by a return phase under pure hydrogen, a characterization phase, and a phase under pure hydrogen with regeneration of the anodic electrode according to the method of the invention.

FIG. 2 illustrates the variation in the voltage of the cell during the hydrogen sulphide poisoning: phase Ph1, followed by a return phase under pure hydrogen: phase Ph2, a characterization phase: phase Ph3, and a phase under pure hydrogen with regeneration: phase Ph4.

The return phase under pure hydrogen for 25 hours did not lead to an improvement in performance, but did slow performance degradation. This phase was followed by an electrochemical characterization phase.

In this example embodiment, the test cell was equipped with an RHE (reversible hydrogen electrode) reference electrode in order to allow anodic and cathodic potentials to be measured. The hydrogen supplied to this RHE was supplied by a water electrolysis cell allowing the purity of the hydrogen to be guaranteed.

With the aim of observing an increase in anodic potential, hydrogen stoichiometry was decreased, for example by half ($St_{H2}$=0.5), in order to obtain a substoichiometry ($0<St_{H2}<1$) for a short length of time, for example 3 minutes, while keeping the current density at 0.6 A·cm$^{-2}$. This length of time must be sufficiently short to not degrade the materials of the cell, and sufficiently long to allow the anodic potential of all the cells, in the case of a stack of elementary cells, to be increased. This length of time may be optimized dynamically by the command-control device, depending on anodic potential. In the case where a reference electrode is absent, this length of time is set by the operator.

It was observed that this decrease in hydrogen flow led to a brief increase in anodic potential to about 2 V.

Figure 3:
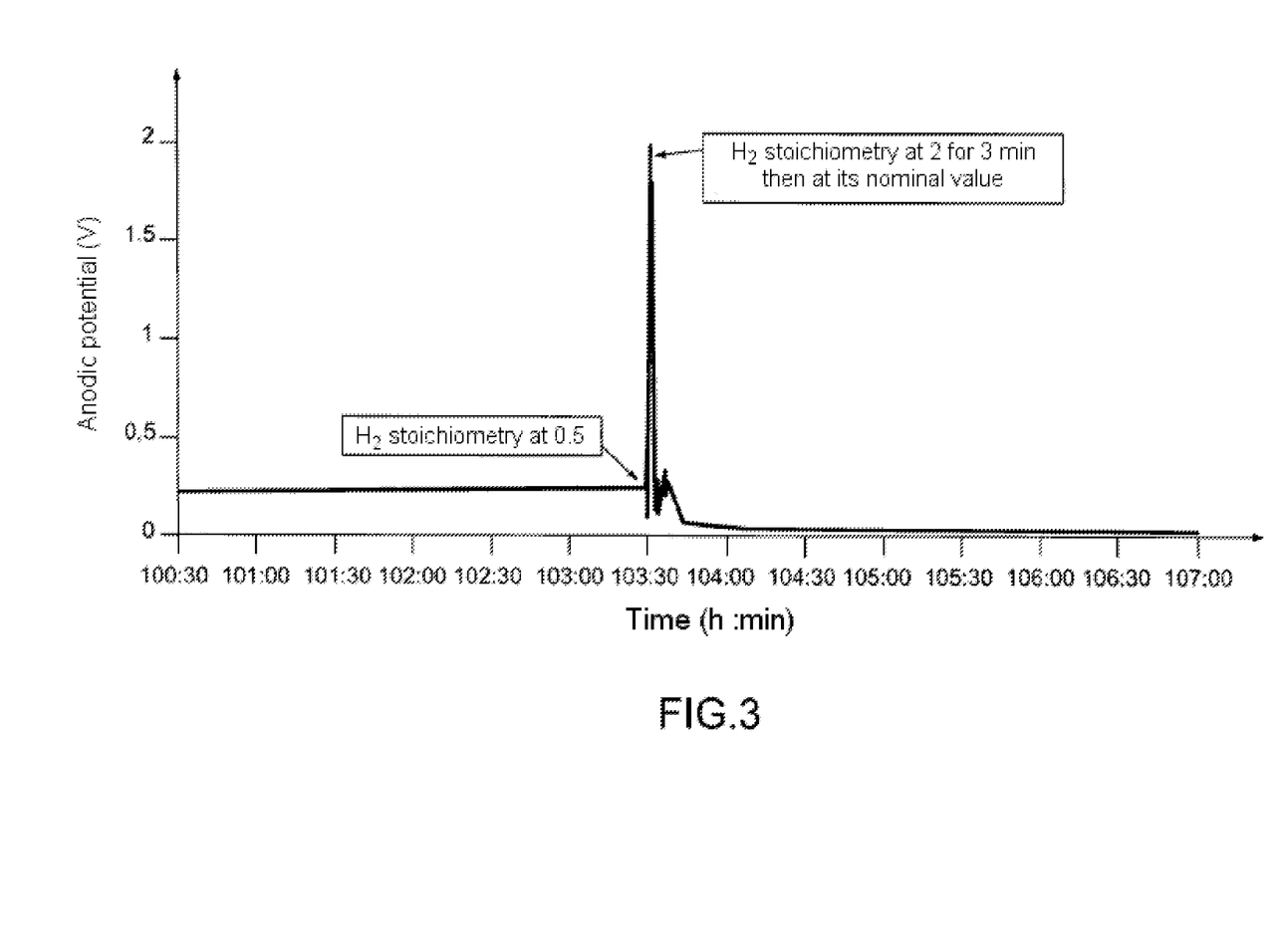
FIG. 3 illustrates the variation in anodic potential during regeneration of the anodic electrode according to the method of the invention.

FIG. 3, which illustrates the variation of anodic potential during the regeneration of the electrode, displays the phase at stoichiometric coefficient $St_{H2}$=0.5, followed by the phase at stoichiometric coefficient $St_{H2}$=2, before return of the coefficient to a nominal value.

Figure 4:
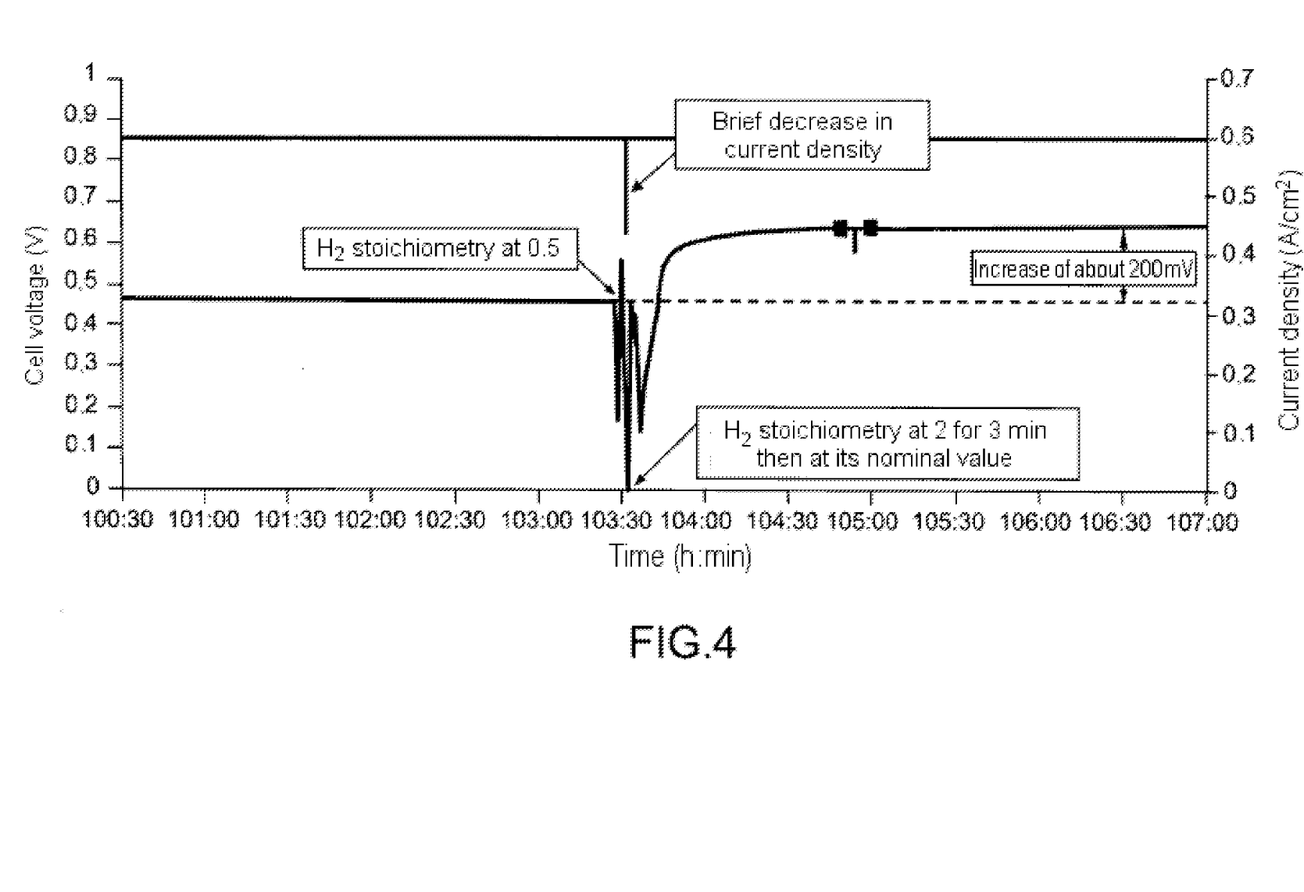
FIG. 4 illustrates the variation in cell voltage during regeneration of the anodic electrode according to the method of the invention.

During this brief increase in anodic potential, current density could not be maintained by the supply because of the lack of hydrogen, thereby causing a brief decrease in current density lasting less than a minute, as shown in FIG. 4 which illustrates the variation in cell voltage during the generation of the electrode.

According to the present invention, during this effect, a zero current was applied for a length of time called the cut-off time.

Hydrogen stoichiometry was then greatly increased, for example to 2, in order to obtain a superstoichiometry ($St_{H2}$>1) for a period that was sufficiently short to prevent too much hydrogen from being consumed, but also sufficiently long to accelerate the return of hydrogen back to catalytic sites and therefore ensure a rapid return to normal operation. This period may, for example, last 3 minutes.

Stoichiometry was then returned to its nominal value (higher than 1).

In this way, it was unexpectedly observed that the cell voltage had increased to a value higher than the voltage measured before the flow was decreased.

The regeneration method of the present invention therefore allows a voltage increase of about 200 mV to be obtained, i.e. a recovery of 97% of the initial value of the cell voltage.

These tests validate the effectiveness of the method of the invention, which results in a voltage increase, and proves that the increase in anodic potential generated by decreasing hydrogen flow enables effective oxidation of sulfur compounds adsorbed on the surface of the catalyst, and therefore depollution of the anode.

The observed decrease in current density confirms this explanation. Specifically, because of the lack of hydrogen, the supply can no longer maintain the current density at its setpoint value, meaning that other reaction mechanisms, such as the oxidation of adsorbed sulfur, are solicited.

Figure 5A:
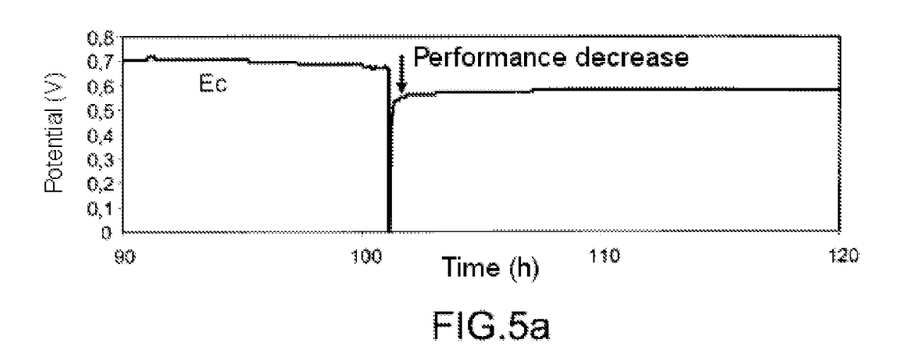
FIGS. 5a and 5b illustrate the variation in the potential Ec at the cathode when a current cut-off is not applied, and when a current cut-off is applied, in the context of the invention, respectively.
Figure 5B:
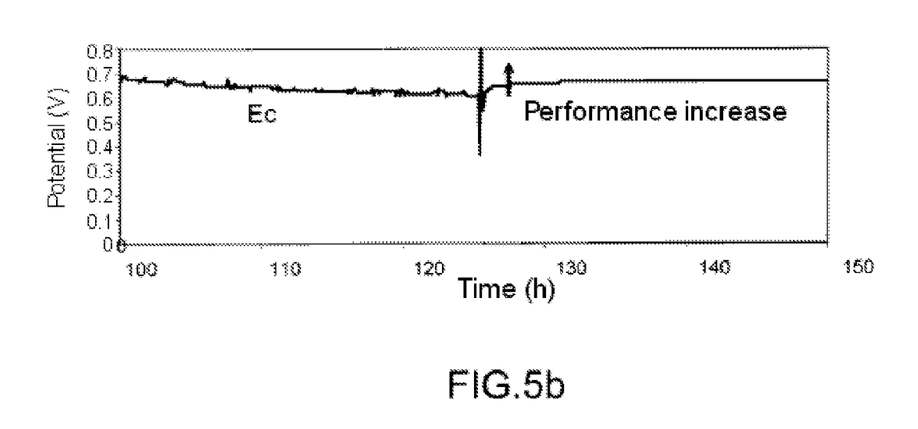

FIGS. 5a and 5b display the variation in cathode potential Ec when a cut-off current is not applied (FIG. 5a) and when a cut-off current is applied in the context of the invention (FIG. 5b), respectively.

It would thus appear that the performance of the potential Ec increased by virtue of the current cut-off operation.

The invention claimed is:

1. A method for depolluting and regenerating a catalytic fuel-cell electrode in a fuel cell having a fuel and operating with a fuel flow and at a current density, the reaction of the fuel of the fuel cell and capture of at least one polluting species occurring on said catalytic electrode, comprising the following steps:
   a decrease, at a constant current density being a first reference current density, in the fuel flow, relative to a nominal fuel flow, for a first length of time, leading to a value for a stoichiometric coefficient ($StH_2$) of said fuel lower than 1, so as to increase the oxidation potential on said catalytic electrode and reach the oxidation potential of said polluting species, in order to eliminate said polluting species;
   a cut-off of the current for a length of time called the cut-off time;
   an increase in the fuel flow above the nominal flow, leading, once more, to a value of the stoichiometric coefficient higher than or equal to 1; and
   an increase in the current density until a second current density chosen by the operator is reached.

2. The method for depolluting and regenerating a catalytic fuel-cell electrode as claimed in claim 1, comprising passage to zero current triggered by observation of a drop in current density.

3. The method for depolluting and regenerating a catalytic fuel-cell electrode as claimed in claim 1, comprising passage to zero current triggered by control of a potential of the electrode, and therefore a voltage of the fuel cell, varying over time.

4. The method for depolluting and regenerating a catalytic fuel-cell electrode as claimed in claim 1, in which the cut-off time is between 30 seconds and 5 minutes.

5. The method for depolluting and regenerating a catalytic fuel-cell electrode as claimed in claim 1, in which the increase in current density until about said second current density is reached is carried out gradually.

6. The method for depolluting and regenerating a catalytic fuel-cell electrode as claimed in claim 1, in which the increase in the current density until about said second current density is reached is carried out in successive steps.

7. The method for depolluting and regenerating a catalytic fuel-cell electrode as claimed in claim 1, in which the fuel is hydrogen-based, the catalytic electrode being noble-metal based.

8. The method for depolluting and regenerating a catalytic electrode as claimed in claim 7, in which the noble metal is platinum, palladium or ruthenium.

9. The method for depolluting and regenerating a catalytic electrode as claimed in claim 7, in which the fuel is based on pure hydrogen.

10. The method for depolluting and regenerating a catalytic fuel-cell electrode as claimed in claim 7, in which the fuel is based on reformed hydrogen.

11. The method for depolluting and regenerating a catalytic fuel-cell electrode as claimed in claim 7, in which the catalytic electrode comprises platinum nanoparticles supported by carbon aggregates.

12. The method for depolluting and regenerating a catalytic fuel-cell electrode as claimed in claim 7, in which the polluting species is a sulfur-containing species.

13. The method for depolluting and regenerating a catalytic fuel-cell electrode as claimed in claim 12, in which the duration of the decrease in hydrogen flow is adjusted to achieve a threshold anodic potential on the catalytic electrode at least higher than 0.9 V.

14. The method for depolluting and regenerating a catalytic fuel-cell electrode as claimed in claim 13, in which the decrease in hydrogen flow is maintained for at least about one minute and less than about ten minutes.

15. The method for depolluting and regenerating a catalytic fuel-cell electrode as claimed in claim 12, in which the polluting species is hydrogen sulfide.

16. The method for depolluting and regenerating a catalytic fuel-cell electrode as claimed in claim 7, in which the polluting species is a carbon-containing species.

17. The method for depolluting and regenerating a catalytic fuel-cell electrode as claimed in claim 16, in which the polluting species is carbon monoxide.

18. The method for depolluting and regenerating a catalytic fuel-cell electrode as claimed in claim 1, comprising the following steps in succession:
- a decrease in fuel flow from a nominal value corresponding to a first stoichiometric value, for a first length of time, causing the potential on said catalytic electrode to pass from an initial value to a first value higher than or equal to the oxidation potential of the polluting species;
- an increase in fuel flow corresponding to a second stoichiometric value, for a second length of time, in order to accelerate the flow of fuel toward the catalytic sites of the anode; and
- return of the flow to said nominal operating value for the reaction of the fuel at the catalytic electrode.

19. The method for depolluting and regenerating a catalytic fuel-cell electrode as claimed in claim 18, in which the first length of time and the second length of time are about 3 minutes.

20. The method for depolluting and regenerating a catalytic fuel-cell electrode as claimed in claim 18, in which the first stoichiometric value is about equal to 0.5, the second stoichiometric value being about equal to 2.

* * * * *